2,887,148
PNEUMATIC TIRE BUILDING APPARATUS

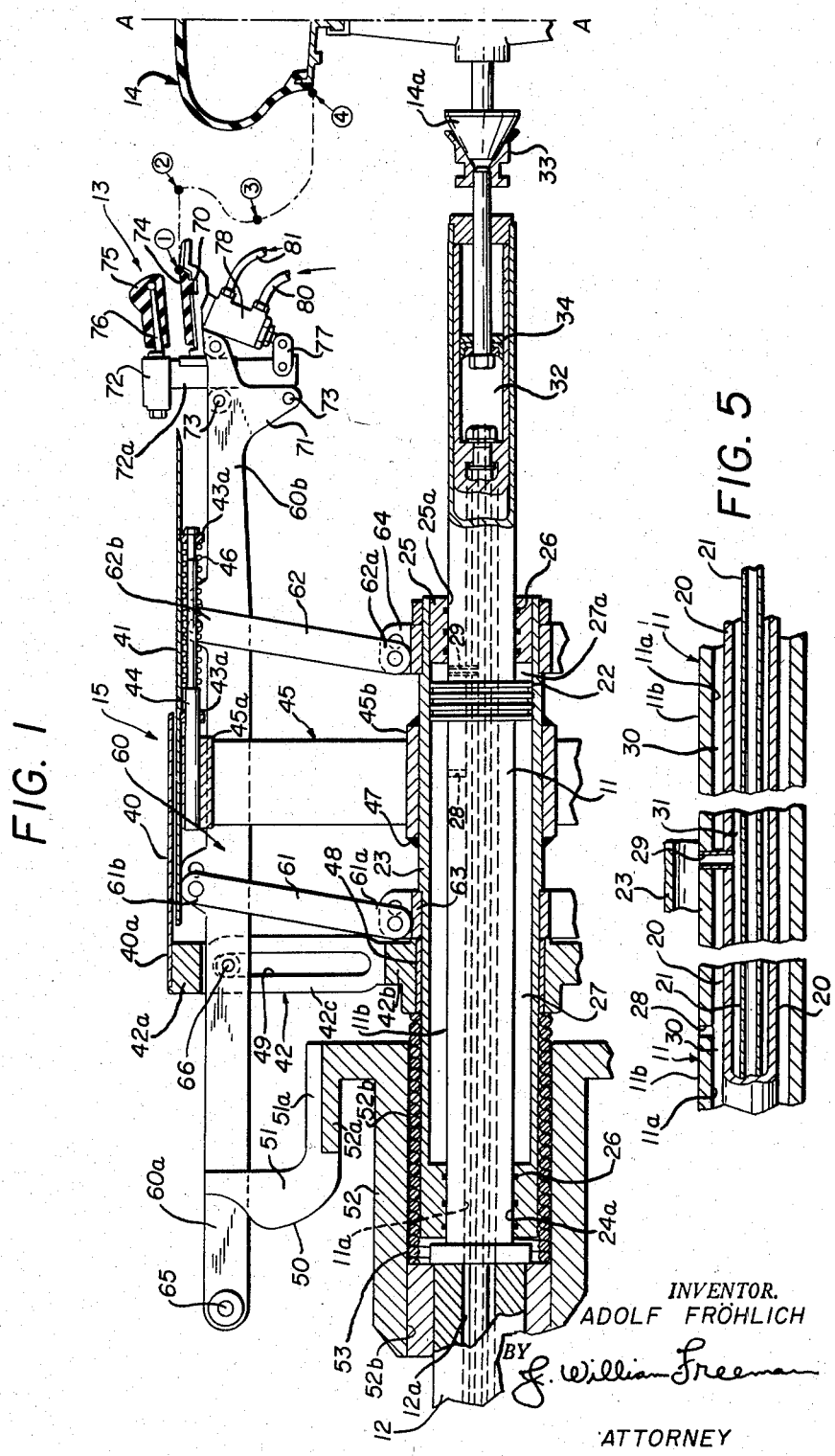

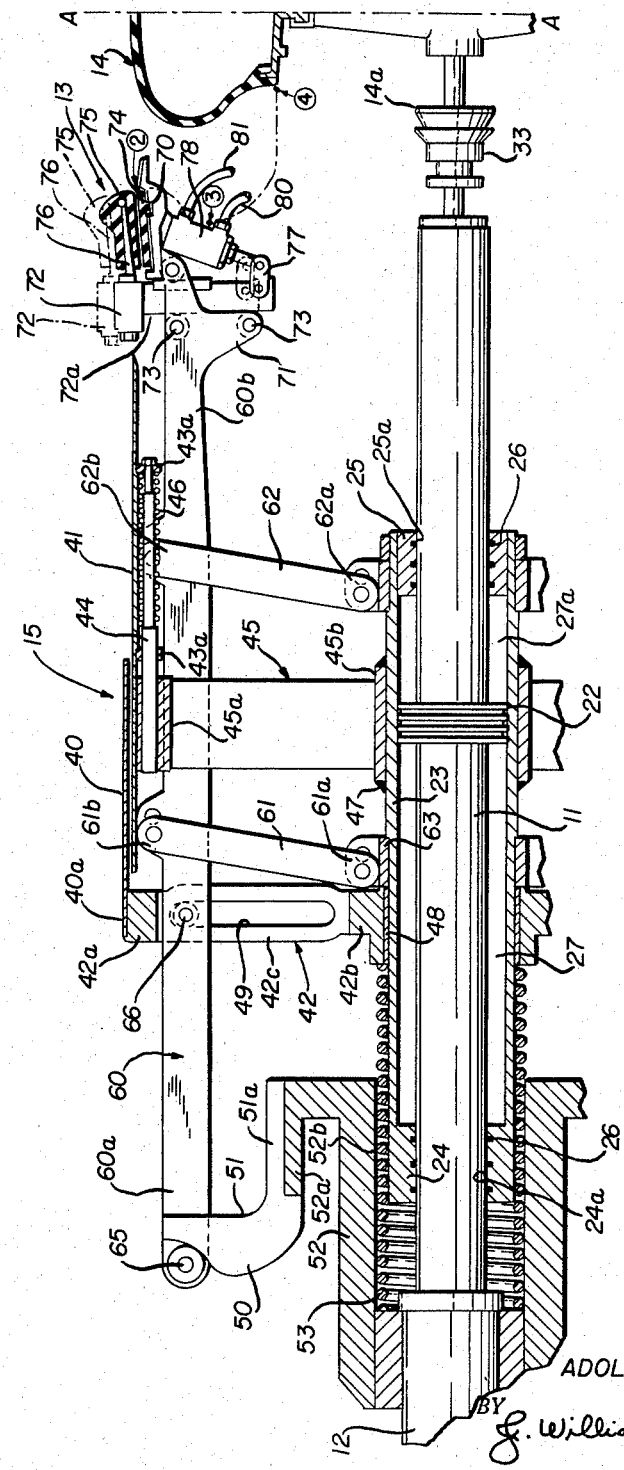

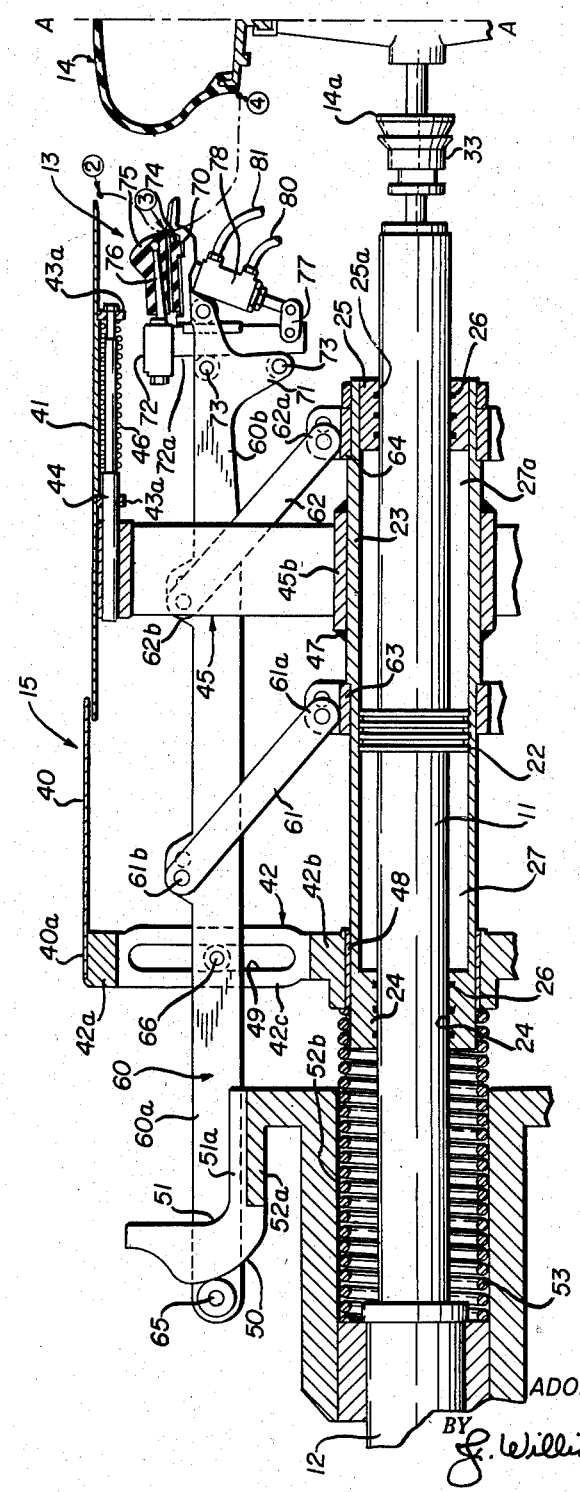

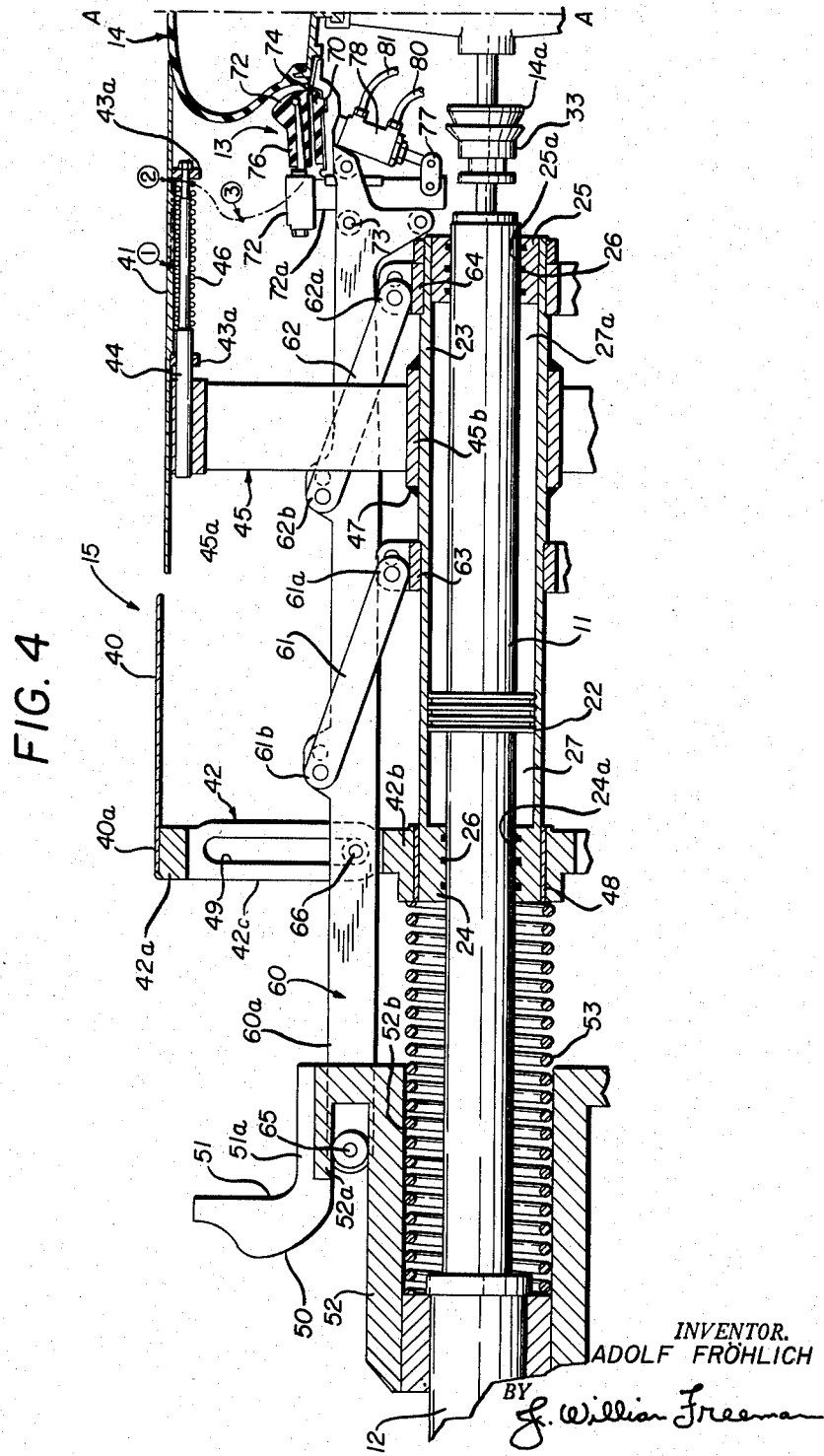

Adolf Frohlich, Hannover, Germany, assignor to The Cleveland Trust Company, Cleveland, Ohio, as trustee Application May 2, 1955, Serial No. 505,446

8 Claims. (Cl. 154—9)

This invention relates to pneumatic tires, and in particular, relates to improved methods and apparatus for building pneumatic tires.

For several years past, pneumatic tires have been constructed by building up a plurality of fabric plies on a cylindrical building drum to produce, in known manner, what is conventionally referred to as a "flat-built" tire of tubular construction. This uncured "flat-built" green tire was then deformed to the customary toroidal shape by the use of an air bag positioned interiorly thereof, and this uncured toroidal form was then vulcanized to produce the finished tire.

The above known prior art has been found disadvantageous in several respects; the first and foremost of which relates to the abnormal stress placed on the individual cord members of the fabric plies during the period that the "flat-built" green tire is deformed to its toroidal shape. In this regard, it is manifest that the toroidal shaped tire has a greater radial girth than the width of the fabric ply, with the result that the cords are longitudinally extended to compensate for this increased girth. From the foregoing, it is necessary that the cords employed in the fabric plies be of the type that are longitudinally extensible.

This prerequisite has substantially limited the use of certain longitudinally non-extensible cord materials such as nylon and wire, due to the fact that this type of cord, being longitudinally non-extensible, is dislodged from the surrounding green rubber of the fabric ply during the period of deformation by the air bag, with the result that use of such cords is precluded.

A further disadvantage of the known prior art relates to the creation of wrinkles in the sidewall area of the fabric ply during the aforementioned period of deformation. These wrinkles occur adjacent the bead area of the tire as a result of the diameter being less at this point than the diameter of the tread area. The obvious effect of such wrinkles from a structural standpoint is that the same cause the individual cords to be loosely folded in this area, with the result that the effectiveness thereof is impaired in this area. Additionally, these wrinkles must be smoothed out for appearance purposes, with a stitching tool, the use of which sometimes results in premature, inadvertent damage to the cord members.

From the foregoing, it appears manifest that the known prior art methods of pneumatic tire construction result in the creation of non-uniform stress in the individual fabric cords of the pneumatic tire. These stresses, in the form of longitudinal tension, are extremely severe in certain areas, while being nonexistent in other areas. The overall result of such abnormality is a pneumatic tire having a plurality of cord members incapable of functioning in the most efficient manner.

In U.S. Patent 2,503,815, certain improved tire building apparatus was set forth that was intended to obviate the above difficulties. In essence, this apparatus taught the use of a retracting curvilinear movement to apply fabric plies about a centrally positioned annular building core. The purpose of the retracting curvilinear movement in this apparatus was to create uniform tension in the cord members by making the retracting curve approximate the girth of the core. In this manner, the fabric applied to the core was always under some degree of tension, with the result that tires produced by this apparatus were characterized by the presence of cord members that were under varying degrees of longitudinal tension.

In essence, the apparatus employed in the achievement of such new and improved results as above outlined, depends upon the combined radial and axial movement of two opposed circular courses of gripping elements through a fabric application cycle. This application cycle is defined by a curvilinear path of movement that features combined axial and radial movement of the individual gripping elements about the axis of the building core. In this manner, a fabric ply, positioned about a split building drum, can have the spaced edge portions thereof gripped by the respective circular courses of gripping elements so as to suspend the fabric ply about the axis of the building core upon separation of the split building drums about the common axis of the building core. When such separation has been effectuated, the gripping elements may be moved through their curvilinear path of combined axial and radial movement so as to retractingly apply the fabric ply about the building core.

One embodiment of such apparatus is illustrated in detail in my co-pending application Serial No. 465,385, filed October 28, 1954. The improved form of the invention herein disclosed is similar in many respects to the above referred to co-pending application with the exception of the construction and actuation of the retractible gripping means per se, and accordingly, reference is directed to the drawings and disclosure of the above referred to co-pending application.

Accordingly, it is the principal object of this invention to provide a tire building machine wherein fabric plies are applied over a central building core in retracting curvilinear movement, and characterized by the presence of improved means for effectuating such retracting curvilinear movement.

This and other objects of the invention will become more apparent upon a reading of the following brief specification, considered and interpreted in the light of the accompanying drawings.

Of the drawings:

Figure 1 is an elevational view of this improved retraction control means, partly broken away and in section, and further illustrating in chain-dotted lines the path of movement of the component parts of the machine.

Figures 2 and 3 are similar views, illustrating the position of the component parts during the intermediate states of operation.

Figure 4 is a similar view, illustrating the position of the component parts in the closed position of the machine.

Figure 5 is an enlarged detail, partly broken away and in section, illustrating the fluid supply means.

Referring now to the drawings, the improved retraction control means, generally designated as 10, are shown mounted on a shaft extension 11 of a main spindle 12 so as to control the combined radial and axial curvilinear path of movement of gripping means 13, 13, it being manifest that such curvilinear movement of the gripping means will occur upon movement of the main building drum 15 axially of the main spindle 12. It is to be understood that a similar set of retraction control means 10 are arranged in a circular course on the opposite side (not shown) of the axis of symmetry A, A of Figure 1 of the drawings.

The exact construction of each main spindle 12 is not shown in complete detail of the drawings, it being understood that the same is of cylindrical configuration and is rotatably supported by the usual upright standards so as to be rotatable with respect thereto upon application of turning force to the spindle 12, in known manner.

The shaft extension 11 is further shown as including the pressurized fluid supply system that operates to effectuate axial movement of the machine. Accordingly, the shaft extension 11 is shown fixed with respect to the spindle 12, so as to have the central opening 11a thereof axially coincident with the central aperture 12a of spindle 12. In this manner, a pair of supply tubes 20 and 21, positioned about the same axis, can be axially positioned within the interior of the aligned openings 11a and 12a to supply fluid under pressure, to thus actuate various component parts, in a manner to be described (see Figure 5).

Additionally, the shaft extension 11 includes a piston head 22 fixedly positioned on shaft extension 11 for axially actuating a surrounding tubular sleeve member 23 that has an integral axial end 24 and a removable, axially spaced end 25. The central apertures 24a and 25a of the ends 24 and 25, respectively, make sliding contact with the external surface 11b of the shaft extension 11, so as to permit axial movement of the sleeve 23 with respect to shaft extension 11. In this regard, it is to be understood that the usual packings 26, 26 are employed to seal off the annular surrounding chamber that is defined by the members 23, 24 and 25. In actuality, this annular surrounding chamber is divided into annular compartments 27 and 27a by the piston 22, and it will be apparent from the drawings that the size of these chambers 27 and 27a will be varied upon axial shifting of the sleeve 23 with respect to the shaft 11, in view of the fixed nature of the piston 22 on shaft extension 11.

For the purpose of effectuating such movement of the sleeve 23 axially of the shaft extension 11, the wall of shaft extension 11 is shown apertured as at 28 to permit fluid contained in an annular cavity 30 to be directed, under pressure, to the annular cavity 27. By like token, a tubular conduit 29 (see Figure 5) communicates the annular cavity 31 with the chamber 27a for similar purposes, it being understood that the annular cavity 31 is defined by the annular space existing between the interior surface of the pipe 20 and the exterior surface of the pipe 21; while the annular cavity 30 is similarly defined as being the annular space existing between the interior wall surface 11a of shaft extension 11 and the exterior surface of pipe 20.

As a further feature of the fluid supply means, fluid supplied interiorly of the pipe 21 is directed axially of the shaft extension 11, so as to enter an annular chamber 32 and thus axially exert a pressurized force against a piston head 34 to thus urge bell flange 33 axially into support position about the hub 14a of core 14.

Turning now to the construction of the drum member, which has been generally designated as 15, it will be seen that each drum member 15 comprises in actuality, a main cylindrical shell 40 and a ply-receiving shell 41 that is relatively movable with respect thereto. To this end, the shell 40 has the end 40a thereof secured to the rim portion 42a of wheel ring 42, while the shell 41 is shiftably mounted, through apertured lugs 43a, 43a, on a spindle 44 that is in turn, secured to the rim portion 45a of a second wheel ring 45; the arrangement being such that the spring 46 operates to urge the shell 41 away from the wheel ring 45, for tensional contact with the core 14 upon the closing of the drum 15 toward the position of Figure 4.

In order that such relative movement between shells 40 and 41 will occur, the wheel ring 45 has the hub ring 45b thereof fixed, as by weld 47, to sleeve 23; while the wheel ring 42 has the hub ring 42b thereof mounted, through keyway 48, on the same exterior surface of the sleeve 23 at an axially spaced point. In this manner, the wheel ring 42 will rotate with the shaft extension 11, but will be additionally able, through keyway 48, to move axially of sleeve 23. As a further structural feature, each spoke 42c of wheel ring 42, includes a slot 49 therein for coaction with the component element of the contracting control means 10, in a manner to be described.

The actual path of curvilinear movement of the gripping elements 13, 13, is controlled, upon relative axial movement between drum 15 and shaft extension 11 by the use of a contoured cam surface 50 that is presented on each individual cam plate 51, 51 and acts as a cam guide as will be described. These cam plates 51, 51 are secured at their end portions 51a, 51a thereof, to the axially extending flange 52a of a sleeve 52, and in this manner, the individual cam plates 51, 51 are fixed with respect to the spindle 12 by virtue of the attachment between the internal surface 52b of sleeve 52 with the external surface 12b of the spindle 12. This internal surface 52b also overlies a longitudinally extending portion of surface 11b of shaft extension 11, so as to define therewith an annular recess within which a spring 53 can be seated for contact with the hub ring 42, for purposes to be described.

With reference now to the structure of the retraction control means per se, it will be seen that the same, in essence, includes a pantograph type of linkage that utilizes the shaft extension 11 as one component link element thereof. The remaining link elements of the pantograph are defined by an elongated arm 60, and links 61 and 62; the arrangement being such that the ends 61a, 62a of links 61 and 62 are pivotally secured to lugs 63 and 64 that are fixed in axially spaced relationship on sleeve 23, while the remaining free ends 61b and 62b of links 61 and 62 are pivotally secured to the elongated arm 60 adjacent the central portion thereof.

For effectuating proper contact with previously described component parts, the projecting end 60a of arm 60 includes a cam roller or follower 65 and a second idler roll 66, the former being capable of contact with cam surface 50 upon shifting of drum 15, while the latter (roll 66) is received in slot 49 of wheel ring 42. The remaining projecting end 60b of each arm 60 carries the gripping element 13 and accordingly, the same is shown as being bifurcated to define an inner clamping head 70 and a support portion 71. The inner clamping head 70 is apertured so as to receive therethrough, the handle portion 72a of an outer clamping member 72 with idler rolls 73, 73 guiding the movement of the handle portion 72a from the full to the chain-dotted line position shown in Figure 2 of the drawings. Endless resilient bands 74, 75 are respectively secured around the circular course of inner clamping heads 70, 70, as well as the circular course of outer clamping heads 72, 72, attachment in the latter case being through fingers 76, 76.

Because of the contracting force offered by the respective bands 74 and 75, it is necessary that separating means be employed to retain the outer clamping heads 72, 72 in the elevated position of Figure 1. Accordingly, the handle 72a of each outer clamping head 72 is shown having the lower portion thereof secured through lugs 77, 77, to one end of a piston 78. In this manner, attachment of the opposed free end of the piston 78 to the inner clamping heads 70, 70 will operate to maintain the clamping heads 72, 72 in spaced relationship to the circular course of clamping heads 70, 70 when the piston is in the contracted position of Figure 1. It is apparent that supply lines 80 and 81 can be utilized to supply pressurized fluid from suitable sources (not shown) in order to provide the requisite pressure needed to operate the valve of piston 78.

*Operation of the device*

In use or operation of the improved retraction control means of this invention, it will first be assumed that the component parts are positioned as shown in Figure 1. It will further be assumed that the bell flange 33 has been extended by entrance of pressurized fluid into the chamber 32 so that the same now surrounds and accordingly supports, the hub 14a of core 14.

In the position of Figure 1, it is apparent that the main shell 40 will be retained in its illustrated position by virtue of force exerted by spring 53 against the hub ring 42b with the limitation of such axial movement on the part of the hub ring 42b being limited by the fixed position of the lug 63.

When it is desired to move the drum 15 horizontally to the position of Figure 2, it is merely necessary that fluid pressure be supplied interiorly of the annular cavity 31 that exists between the pipes 20 and 21. Fluid under pressure in such cavity will emit through opening 29 into the annular chamber 27a, and the expanding force of the same will operate to move the axial end 25 of sleeve 23 to the right of Figure 1 of the drawings towards the position of Figure 2 in view of the fact that the piston 22 is fixed with respect to the shaft extension 11, while the sleeve 23, being fixed to the axial end 25, is capable of moving axially of shaft extension 11. As this entrance of pressurized fluid continues into the chamber 27a, it is manifest that the shell 40 as well as the ply-receiving shell 41, will move to the right also, with the movement of the shell 40 resulting from the force offered by spring 53; while the movement of the ply-receiving shell 41 is a result of the rim flange 45 being fixed with respect to the axially moving sleeve member 23. It is additionally manifest that lugs 63 and 64, being fixed with respect to moving sleeve 23 will similarly move to the right of Figure 1 towards the position of Figure 2, and such movement of the above-mentioned component parts will continue until such time as the cam roller 65 reaches the approximate position of Figure 2.

At this time, the roller 65 will contact the cam surface 50 of the cam plate 51, and when such contact between the cam roller 65 and the cam surface 50 is made, the retraction cycle of the fabric application cycle will commence, with the result that the ring wheel 42 will, in effect, move to the left of Figure 2, while the ring wheel 45 continues on to the right, thus effectuating a separation during this retraction cycle of the shell 40 and the ply-receiving shell 41. Such reversed directional movement of the wheel ring 42 occurs as a result of the idler wheel 66 being carried in the slot 49. Specifically, in this regard, it is noted that the interference created by the slot 49 operates to overcome the resistance offered by the spring 53, and accordingly moves the wheel ring 42 towards the left when movement between the positions of Figures 2 and 3 occurs.

This movement to the left of the elongated arm 60 as a result of the contact between the roller 65 and the cam surface 50, will also result in the link arms 61 and 62 being pivoted counterclockwise about the lug members 63 and 64 because of the lug members 63 and 64 continuing their movement to the right with sleeve 23. Such a position of movement is shown in Figure 3 of the drawings where the roller 66 has dropped radially in the slot 49 as a result of the movement of the roller 65 along the contoured cam surface 50.

When the position of Figure 3 has been reached, continued closing movement towards the position of Figure 4 will result in further pivotal movement of the links 61 and 62 about lugs 63 and 64, respectively, in view of the fact that these lugs (63 and 64), fixed to the sleeve 23, are moving more rapidly to the right of Figure 3 than is the roller 65 which is following the combined radial and axial path defined by the cam surface 50. The movement from the position of Figure 3 to the position of Figure 4 is in effect, a horizontal movement of the gripping elements 13, 13, and this horizontal movement is effectuated as a result of the cam roller 65 moving in the annular recess that is provided between the radially extending flange 52a and the main sleeve 52.

When it is desired to retract the gripping means 13, 13 from the position of Figure 4, it is merely necessary that the supply of fluid to chamber 27a be terminated, and at this time, fluid may be introduced to chamber 27 through port opening 28 by merely supplying pressurized fluid into the annular cavity 30. The effect of the entrance of such pressurized fluid will be to move the axial end 24 to the left of Figure 4 of the drawings, in view of the fixed nature of the piston 22. Such movement to the left of the end 24 will result in similar movement to the left of sleeve 23 and will accordingly operate to return the device to the position of Figure 1, at which time the above cycle may be repeated.

In order that the structural operation of the component parts might be more clearly understood, reference was omitted in the above paragraph to the operation of the clamping means 13, 13. It is to be understood, however, that the band 75 could be moved into clamping relationship with the band 74 when the position of Figure 2 has been reached, by merely supplying pressurized fluid into the line 80, for example, so as to effectuate expansion of the piston 78 to accordingly result in downward movement of the clamping head 72 from the chain-dotted position of Figure 2 to the full line position thereof. It is further apparent in this regard that when the position of Figure 4 has been reached and the fabric application cycle has been completed, pressurized fluid could be supplied through line 81 so as to contract the piston 81 and thus move the clamping head 72 upwardly to the position of Figure 1, at which time the return cycle could be completed as previously described.

After a complete tire has been built, it is further manifest that the fluid pressure could be exhausted from the chamber 32, at which time spring means (not shown) would operate to axially retract the bell flange 33 so that the core 14, having a completed tire thereon, could be removed from the machine for further processing, in known manner.

It will be seen from the above that there has been provided a new and novel method of controlling the retracting curvilinear movement effectuated by gripping means of the improved tire machine as shown and described in the above paragraphs. It has been shown how such apparatus employs a minimum number of parts that coact together with maximum efficiency to produce the new and novel results above set forth. It is apparent that modifications of materials and other standard features of the invention could be effectuated by the use of the teachings of this invention, and accordingly, modifications of the invention may be resorted to without departing from the spirit thereof or the scope of the appended claims.

What is claimed is:

1. A device for building the fabric structure of a pneumatic tire, comprising; a spindle; a building core supported on the axis of said spindle; a plurality of elongated arms having gripping elements thereon and being circularly disposed in radially shiftable condition about the axis of said core at an axial distance therefrom; and guide means for moving said gripping elements radially inward through an axially shiftable curvilinear path corresponding substantially to the radial cross-sectional configuration of said core; said guide means including an endless band surrounding said gripping elements, whereby a radial contracting force is exerted thereagainst; pantograph means projecting radially outwardly from said spindle and having one link thereof defined by said arms; a cam surface carried by said spindle; a cam follower, carried by one said link of said pantograph means and being engageable with said cam surface whereby combined radial and axial movement of said gripping elements is controlled by the contact between said cam surface and said cam follower.

2. A pneumatic tire machine of the character described, comprising; a frame; a spindle, rotatably mounted on said frame; an annular building core; means on said spindle for supporting said core axially thereof; a ply-receiving drum, rotatably secured in axially shiftable relationship with said spindle; a circular course of elongated arms having integral gripping elements on one end thereof and being disposed between said drum and said spindle; and means for shifting said gripping elements both radially and axially of the common axis of said drum, said spindle, and said core; said means including an endless band surrounding said gripping elements, whereby a radial contracting force is exerted thereagainst; pantograph means projecting radially outwardly from said spindle and having one link thereof defined by said arms; a cam surface carried by said spindle; a cam follower, carried by one said link of said pantograph means and being engageable with said cam surface whereby combined radial and axial movement of said gripping elements is controlled by the contact between said cam surface and said cam follower.

3. A machine for building the fabric structure of a pneumatic tire, comprising; an elongated frame; an annular building core; a spindle, having the axis thereof rotatably supported longitudinally of said frame; means for supporting said core over said frame in axially aligned relationship therewith; a ply-receiving drum, rotatably supported on said spindle and being axially shiftable with respect thereto about a common axis; a plurality of elongated arms having integral gripping means on one end thereof and being arranged in a circular course about the common axis of said spindle, said drum, and said core and being disposed between said drum and said spindle; and guide means for shifting said gripping means both axially and radially of the common axis of said drum, said spindle, and said core; said gripping means including an inner course of gripping surfaces; an outer course of gripping surfaces, and means for moving said gripping surfaces into each clamping relationship with each other; said guide means including an endless band surrounding said gripping elements, whereby a radial contracting force is exerted thereagainst; pantograph means projecting radially outwardly from said spindle and having one link thereof defined by said arms; a cam surface carried by said spindle; a cam follower, carried by one said link of said pantograph means and being engageable with said cam surface whereby combined radial and axial movement of said gripping elements is controlled by the contact between said cam surface and said cam follower.

4. A pneumatic tire machine of the character described, comprising; a frame; a spindle, rotatably mounted on said frame; an annular building core; means on said spindle for supporting said core axially thereof; a ply-receiving drum, mounted in axially shiftable relationship on said spindle; a closed cylinder surrounding said spindle and defining therewith a sealed annular chamber; means for moving said cylinder axially of said spindle; a pantograph linkage having opposed link members thereof pivoted to said cylinder whereby said cylinder acts as a link of said pantograph linkage; gripping means provided on an extension of one link element of said pantograph, and cam means engageable with one link of said pantograph upon relative axial movement of said cylinder and said spindle whereby said gripping means are moved through a curvilinear path determined by said cam means.

5. A pneumatic tire machine of the character described, comprising; a frame; a spindle, rotatably mounted on said frame; an annular building core; means on said spindle for supporting said core axially thereof; a ply-receiving drum, mounted in axially shiftable relationship on said spindle; a closed cylinder surrounding said spindle and defining therewith a sealed annular chamber; means for moving said cylinder axially of said spindle; a pantograph linkage having opposed link members thereof pivoted to said cylinder whereby said cylinder acts as a link of said pantograph linkage; gripping means provided on an extension of one link element of said pantograph, and cam means engageable with one link of said pantograph upon relative axial movement of said cylinder and said spindle whereby said gripping means are moved through a curvilinear path determined by said cam means; said means for moving said cylinder axially of said spindle including a fixed piston head provided on said spindle and dividing said chamber into two sub-chambers; a reservoir for pressurized fluid; and means for selectively directing said pressurized fluid into either of said sub-chambers.

6. A device for building the fabric structure of a pneumatic tire, comprising; a spindle; a building core supported on the axis of said spindle; a plurality of elongated arms having gripping elements thereon and being circularly disposed in radially shiftable condition about the axis of said core at an axial distance therefrom; and guide means for moving said gripping elements radially inward through an axially shiftable curvilinear path corresponding substantially to the radial cross-sectional configuration of said core; said guide means including pantograph means projecting gradually outwardly from said spindle and having one link thereof defined by said arms; and a cam surface carried by said spindle; a cam follower, carried by one said link of said pantograph means and being engageable with said cam surface whereby combined radial and axial movement of said gripping elements is controlled by the contact between said cam surface and said cam follower.

7. A pneumatic tire machine of the character described, comprising; a frame; a spindle, rotatably mounted on said frame; an annular building core; means on said spindle for supporting said core axially thereof; a ply-receiving drum, rotatably secured in axially shiftable relationship with said spindle; a circular course of elongated arms having integral gripping elements on one end thereof and being disposed between said drum and said spindle; and means for shifting said gripping elements both radially and axially of the common axis of said drum, said spindle, and said core; said means including pantograph means projecting radially outwardly from said spindle and having one link thereof defined by said arms; and a cam surface carried by said spindle; a cam follower, carried by one said link of said pantograph means and being engageable with said cam surface whereby combined radial and axial movement of said gripping elements is controlled by the contact between said cam surface and said cam follower.

8. A machine for building the fabric structure of a pneumatic tire, comprising; an elongated frame; an annular building core; a spindle, having the axis thereof rotatably supported longitudinally of said frame; means for supporting said core over said frame in axially aligned relationship therewith; a ply-receiving drum, rotatably supported on said spindle and being axially shiftable with respect thereto about a common axis; a plurality of elongated arms having integral gripping means on one end thereof and being arranged in a circular course about the common axis of said spindle, said drum, and said core and being disposed between said drum and said spindle; and guide means for shifting said gripping means both axially and radially of the common axis of said drum, said spindle, and said core; said gripping means including an inner course of gripping surfaces; an outer course of gripping surfaces, and means for moving said gripping surfaces into each clamping relationship with each other; said guide means including pantograph means projecting radially outwardly from said spindle and having one link thereof defined by said arms; a cam surface carried by said spindle; a cam follower, carried by one said link of said pantograph means and being engageable with said cam surface whereby combined radial and axial movement of said gripping elements is controlled by the contact between said cam surface and said cam follower.

References Cited in the file of this patent

UNITED STATES PATENTS

| | | |
|---|---|---|
| 2,313,035 | Breth | Mar. 9, 1943 |
| 2,480,811 | McCoy | Aug. 30, 1949 |
| 2,501,644 | Kraft et al. | Mar. 21, 1950 |
| 2,503,815 | Frohlich | Apr. 11, 1950 |

FOREIGN PATENTS

| | | |
|---|---|---|
| 152,039 | Austria | Dec. 27, 1937 |